(12) United States Patent
Motobayashi et al.

(10) Patent No.: US 7,212,500 B2
(45) Date of Patent: May 1, 2007

(54) ANS DESIGNED FOR A CONFERENCE BETWEEN CONFERENCE ROOM TERMINALS AND NETWORK SYSTEM INCLUDING THE ANS

(75) Inventors: Ryota Motobayashi, Tokyo (JP); Fumiyasu Hayakawa, Kanagawa (JP); Mayumi Hara, Kanagawa (JP)

(73) Assignee: NEC Corporation, Tokyo (JP)

( * ) Notice: Subject to any disclaimer, the term of this patent is extended or adjusted under 35 U.S.C. 154(b) by 921 days.

(21) Appl. No.: 09/940,668

(22) Filed: Aug. 29, 2001

(65) Prior Publication Data
US 2002/0060989 A1    May 23, 2002

(30) Foreign Application Priority Data
Aug. 30, 2000    (JP)    ............... 2000-260548

(51) Int. Cl.
*H04L 12/16*    (2006.01)
(52) U.S. Cl. .............. 370/260; 370/264; 379/202.01; 379/201.02
(58) Field of Classification Search ............... 370/260, 370/264, 261, 262, 263; 379/202.01, 201.02, 379/201.03, 201.07, 201.08, 201.01; 348/14.08, 348/14.09
See application file for complete search history.

(56) References Cited

U.S. PATENT DOCUMENTS

| | | | | |
|---|---|---|---|---|
| 5,471,318 A | * | 11/1995 | Ahuja et al. ................. 358/400 |
| 5,546,324 A | * | 8/1996 | Palmer et al. ............. 348/14.1 |
| 5,627,978 A | * | 5/1997 | Altom et al. ................ 715/758 |
| 5,638,114 A | * | 6/1997 | Hatanaka et al. ......... 348/14.09 |
| 5,680,392 A | * | 10/1997 | Semaan ....................... 370/261 |
| 5,796,734 A | * | 8/1998 | Izawa et al. ................ 370/394 |
| 5,862,329 A | * | 1/1999 | Aras et al. ................... 709/204 |
| 5,887,136 A | * | 3/1999 | Yasuda et al. .............. 709/204 |
| 5,930,238 A | * | 7/1999 | Nguyen ....................... 370/260 |
| 5,991,276 A | * | 11/1999 | Yamamoto ................... 370/260 |
| 5,999,208 A | * | 12/1999 | McNerney et al. ....... 348/14.08 |
| 6,020,915 A | * | 2/2000 | Bruno et al. ............. 348/14.09 |
| 6,026,080 A | * | 2/2000 | Roy ........................... 370/260 |

(Continued)

FOREIGN PATENT DOCUMENTS

JP    3-245690    11/1991

(Continued)

OTHER PUBLICATIONS

ATM Forum Technical Committee, "ATM Name System Specification Version 1.0", af-saa-0069.000, Nov. 1996.

(Continued)

*Primary Examiner*—Wing Chan
*Assistant Examiner*—Andrew C. Lee
(74) *Attorney, Agent, or Firm*—Young & Thompson

(57) ABSTRACT

In an ANS used for a television conference between calling and destined conference room terminals accommodated in an ATM network, an address of each conference room terminal is stored in an address database as address resolution data which have no hierarchical structure and which therefore uniquely define each conference room terminal. A priority level of each conference room terminal is also stored in the address database and is referenced on occurrence of congestion so as to determine whether or not a connection is released during a conference. Reservation data may be stored in the ANS together with topology data and connection data.

20 Claims, 17 Drawing Sheets

U.S. PATENT DOCUMENTS

| | | | |
|---|---|---|---|
| 6,058,122 A * | 5/2000 | Hwang et al. | 370/522 |
| 6,243,383 B1 * | 6/2001 | Li et al. | 370/395.6 |
| 6,314,088 B1 * | 11/2001 | Yamano | 370/254 |
| 6,363,411 B1 * | 3/2002 | Dugan et al. | 709/202 |
| 6,466,252 B1 * | 10/2002 | Miyazaki | 370/260 |
| 6,587,870 B2 * | 7/2003 | Takagi et al. | 709/204 |
| 6,600,725 B1 * | 7/2003 | Roy | 370/261 |
| 6,636,505 B1 * | 10/2003 | Wang et al. | 370/352 |
| 6,640,248 B1 * | 10/2003 | Jorgensen | 709/226 |
| 6,657,975 B1 * | 12/2003 | Baxley et al. | 370/260 |
| 6,665,730 B1 * | 12/2003 | Michelson et al. | 709/238 |
| 6,757,743 B1 * | 6/2004 | Tamori et al. | 709/249 |
| 6,760,750 B1 * | 7/2004 | Boneh et al. | 709/204 |
| 6,788,649 B1 * | 9/2004 | Dugan et al. | 370/254 |
| 6,795,443 B1 * | 9/2004 | Jeong et al. | 370/395.5 |
| 6,853,716 B1 * | 2/2005 | Shaffer et al. | 379/202.01 |

FOREIGN PATENT DOCUMENTS

| | | |
|---|---|---|
| JP | 4-35184 | 2/1992 |
| JP | 10-98480 | 4/1998 |
| JP | 11-308337 | 11/1999 |

OTHER PUBLICATIONS

ATM Forum Technical Committee, "ATM Name System V2.0", afdans-0152.000, Jul. 2000.

* cited by examiner

5a ADDRESS DB

| | 5a1 | 5a2 | 5a3 | 5a4 |
|---|---|---|---|---|
| | ITEM NUMBER | CONFERENCE ROOM NAME | AESA | CLASS |
| | 1 | HEAD OFFICE | 39392F....0100 | PRIORITY |
| | 2 | BRANCH A1 | 39392F....0200 | NON-PRIORITY |
| | 3 | BRANCH B1 | 39392F....0300 | PRIORITY |
| | 4 | BRANCH B2 | 39392F....0400 | NON-PRIORITY |

FIG. 7

| ITEM NUMBER (5a5) | HOST NAME (5a6) | AESA OR RESOLUTION (5a7) |
|---|---|---|
| 1 | salmon | 39392F....0100 |
| 2 | char | 39392F....0200 |
| ... | ... | ... |
| 3 | EXCEPT FOR "data example com" | QUERY TO ANY OTHER ANS ON "example com" LAYER |
| ... | ... | ... |

FIG. 8
PRIOR ART

5b RESERVATION DB

| | 5b1 | 5b2 | 5b3 |
|---|---|---|---|
| | ITEM NUMBER | CONNECTIONS | DATE |
| | 1 | CONFERENCE ROOMS: HEAD OFFICE 1 ~BRANCH | April 1 13:15~15:00 |
| | 2 | CONFERENCE ROOMS: HEAD OFFICE 2 ~BRANCH A2 ~BRANCH B1 ~BRANCH C1 | April 2 10:30~12:00 |
| | 3 | BRANCH D1 ~BRANCH E1 | April 3 14:30~16:00 |
| | | | |

FIG. 10

5c TOPOLOGY DB

| ITEM NUMBER | SECTION | BAND CAPACITY |
|---|---|---|
| | 5c2 | 5c3 |
| 1 | CONFERENCE ROOM (HEAD OFFICE 1) ~HEAD OFFICE (CHANNEL 1) | 150Mbps |
| 2 | HEAD OFFICE SW (CHANNEL 2) ~BRANCH A SW (CHANNEL 1) | 600Mbps |
| 3 | BRANCH SW (CHANNEL2) ~SALES DEPARTMENT B SW (CHANNEL 1) | 600Mbps |
| 4 | SALES DEPARTMENT B SW (CHANNEL 2) ~CONFERENCE ROOM (SALES DEPARTMENT B1) | 150Mbps |

(5c1 labels the ITEM NUMBER column)

FIG. 11

5d CONNECTION DB

| ITEM NUMBER (5d1) | OCCUPIED SECTION (5d2) | RESERVE /INSTANT (5d3) | START TIME (5d4) | CLASS (5d5) |
|---|---|---|---|---|
| 1 | CONFERENCE ROOM (HEAD OFFICE 1) ~ HEAD OFFICE SW (CHANNEL 1)<br><br>HEAD OFFICE SW (CHANNEL 2) ~ BRANCH A SW (CHANNEL 1)<br><br>BRANCH A SW (CHANNEL 2) ~ SALES DEPARTMENT B SW (CHANNEL 1)<br><br>SALES DEPARTMENT B SW (CHANNEL 2) ~ CONFERENCE ROOM (SALES DEPARTMENT B1) | INSTANT | 13:15 | PRIORTY |

FIG. 12

5a ADDRESS DB

| 5a8 | 5a9 | 5a10 ACCOMMODATED POSITIONS | | | | 5a11 |
|---|---|---|---|---|---|---|
| ITEM NUMBER | CONFERENCE ROOM NAME | SWITCH | CHANNEL | VPI | VCI | CLASS |
| 1 | HEAD OFFICE 1 | HEAD OFFICE | 010 | 0 | 032 | PRIORITY |
| 2 | BRANCH A1 | BRANCH A | 020 | 0 | 032 | NON-PRIORITY |
| 3 | BRANCH B1 | BRANCH B | 030 | 0 | 032 | PRIORITY |
| 4 | BRANCH B2 | BRANCH B | 031 | 0 | 032 | NON-PRIORITY |

FIG. 16

ANS DESIGNED FOR A CONFERENCE BETWEEN CONFERENCE ROOM TERMINALS AND NETWORK SYSTEM INCLUDING THE ANS

BACKGROUND OF THE INVENTION

This invention relates to an ATM (Asynchronous Transfer Mode) name system which is for use in a television conference system which carries out a conference between a plurality of conference room terminals through an ATM (Asynchronous Transfer Mode) network. Herein, it is to be noted that each of the conference room terminals is placed in a meeting or conference room and has a function of carrying out a conference by the use of a television set with other conference room terminal or terminals through an ATM network.

Herein, an ATM name system (will be often abbreviated to ANS hereinafter) has been defined in the ATM Name System Specification Version 1.0 (af-saa-0069.000), published by the ATM Forum Technical Committee (November, 1996). The specification has been prescribed on the basis of the DNS (Domain Name Server) determined by IETF (Internet Engineering Task Force) on the requests for comments (RFC) 1034 and 1035.

This shows that the ATM name system (ANS) is similar to the DNS and, therefore, a host name should include a domain name of a hierarchical structure. The ANS finally resolves an ATM end system address (AESA) by executing retrieval by the host name. More specifically, the exemplification has been made as the host name "salmon.data.example.com" in the above-mentioned specification (af-saa-0069.000). In this event, the host name "salmon.data.example.com" is used as a key on retrieval and such retrieval finally resolves or gives an AESA, such as 39.246f.000e7c9c031200010001.000012345678.00.

However, consideration is not made at all in the above-mentioned ANS about application to a television conference that is executed or held by using the ANS. In this connection, the above-mentioned ANS is not suitable for the television conference and has various defects and disadvantages that will be enumerated below.

For example, the ANS in question can not directly resolve an AESA on the basis of a destination conference room terminal because the host name of the hierarchical structure should be used as a key on resolving an AESA. More specifically, resolving an AESA in relation to the above-mentioned host name of ".data.example.com" is carried out by an ANS placed in ".data.example.com" domain.

However, it should be considered that a host name in a domain of ".example.com" without ".data" is resolved in such an ATM network system. In this case, any query should be issued once to an ANS placed the domain of ".example.com" on an upper layer, so as to be informed of an additional ANS placed on a layer equivalent to the layer of ".data". Thus, the host name is resolved into an AESA by the additional ANS.

Likewise, when a host name ".com" without ".example" is given, a query is issued to an ANS placed on an upper layer of ".com" to have the upper layer ANS introduce an additional ANS placed on a layer equivalent to the layer of ".example". Finally, the host name is resolved in such an additional ANS. Furthermore, if a host name without ".com" is given, a query is issued to an ANS placed on an uppermost layer to get an ANS on the uppermost layer. As a result, resolution is made by the ANS on the uppermost layer.

From this fact, it is readily understood that the domains should have a hierarchical structure and ANS should be distributed and arranged on the respective layers. In this event, if host names, such as "conference room 1. head office" and "conference room 2. branch A" are given, which should be represented by host names of hierarchical structures. This shows that ANSs are necessary for both the head office and the branch and hardware becomes large in size with the above structure.

Moreover, the ATM Name System Specification Version 1.0 (af-saa-0069.000) never points out problems that might occur in a multipoint conference. In this connection, no consideration is made at all in the specification about an ANS used in the multipoint conference and about using a multipoint conference unit (MCU).

SUMMARY OF THE INVENTION

It is an object of this invention to provide an ATM number system (ANS) which can be used for carrying out a television conference in an ATM network system.

It is another object of this invention to provide an ANS of the type described, which can carry out both a one-to-one conference and a multipoint conference.

It is still another object of this invention to provide an ANS of the type described, which can resolve an ASEA by not using a host name of a hierarchical structure.

It is yet another object of this invention to provide an ANS of the type described, which can resolve the AESA without issuing an query to an upper layer of the host name.

It is another object of this invention to provide an ANS of the type described, which can be used even when the ANS is coupled through an intranet (LAN).

It is yet another object of this invention to provide an ANS of the type described, which applies to a system operable by using a technique of either SVC (Switched Virtual Connection) or PVC (Permanent Virtual Connection).

It is a further object of this invention to provide a network system which comprises the ATM network and the above-mentioned ANS.

An ATM name system (ANS) to which this invention is applicable for use in a network system which carries out a conference between a plurality of conference room terminals through an ATM (Asynchronous Transfer Mode) network, the conference room terminals comprising a calling conference room terminal for issuing a request for address resolution to the ANS before establishment of a connection between the calling conference room terminal and a destined one of the conference room terminals. The request indicates a room name assigned to the destined conference room terminal. According to an aspect of this invention, the ANS comprises a storage section for storing the room name and an ATM end system address (AESA) of the destined conference room terminal and processing means for processing the request to resolve the AESA of the destined conference room terminal by referring to the storage by the use of the room name and to send a resolved AESA to the calling conference room terminal.

According to another aspect of this invention, the storage section comprises an address database for storing a priority level corresponding to the room name together with the corresponding AESA. The processing means is operable in response to the request to also resolve a priority class of the conference between the calling and the destined conference room terminals with reference to the priority level stored in the address database.

According to still another aspect of this invention, the storage section further comprises a reservation database for storing a reservation that is specified by a start time and an end time of the conference together with the connection.

According to yet another aspect of this invention, the processing means comprises judging means for judging whether or not the conference is reserved by referring to the reservation database to monitor the start and the end times when the reservation is made in connection with the conference.

According to another aspect of this invention, the judging means further starts the connection at the start time when the reservation is made, so as to hold the conference between the calling and the destined conference room terminals. The judging means also judges whether or not a conference duration between the start and the end times lapses, to send, prior to the end time, a previous announcement of releasing the connection to at least one of the calling and the destined conference room terminals.

According to yet another aspect of this invention, the storage section further comprises a topology database for storing a topology of each conference room terminal in the network system and a connection database for storing a connection relationship between the calling and the destined conference room terminals. The processing means monitors the conference with referring to the topology and the connection relationship stored in the topology and the connection databases.

According to a specific aspect of this invention, an ATM name system (ANS) is for use in a network system which carries out a multipoint conference between a calling conference room terminal and a plurality of destined conference room terminals through an ATM (Asynchronous Transfer Mode) network. The calling conference room terminal is for issuing a request for address resolution to the ANS before establishment of connections for the mulitpoint conference. Under the circumstances, the ANS is associated with a multipoint conference unit (MPU) and comprises processing means for processing the request from the calling conference room terminal to resolve an AESA assigned to the MCU when the multipoint conference is indicated by the request and communication means for carrying out communication between the ANS and the MCU to connect the MCU to the respective conference room terminals attending the multipoint conference.

The above-mentioned ATM name system may further comprise a topology database for storing topology data representative of positions of the calling and the destined conference room terminals in the network system and band data representative of bands of transmission channels used in the multipoint conference. In this event, the processing means being for selecting the MCU by referring to the topology database.

According to another specific aspect of this invention, the processing means selects the MCU by recognizing the positions of the calling and the destined conference room terminals and by predicting occupied bands from the band data.

According to still another specific aspect of this invention, the communication means issues a call setup request to the MCU after the AESA of the MCU is resolved.

According to yet another specific aspect of this invention, the ANS further comprises a connection database for storing each occupied band of currently used transmission channels and a reserved state. The processing means comprises judging means for judging whether or not the connections are established by referring to each occupied band and the reserved state of the connection database.

According to another specific aspect of this invention, the judging means also refers to an occupied state of the MCU so as to establish the connections.

According to another specific aspect of this invention, an ATM name system further comprises means for storing a priority level of each conference room terminal. The processing means comprises means for determining the connections with reference to the priority level so as to preferentially establish the connections related to the conference room terminal of a higher priority level, when any congestion takes place in the network system.

According to another specific aspect of this invention, the processing means comprises means for forcibly releasing an existing connection in consideration of an occupied state of the transmission channels and the MCU.

According to another specific aspect of this invention, the processing means comprises means for transmitting an indication of forcibly releasing to conference room terminals to be released.

According to yet another specific aspect of this invention, the processing means further comprises means for informing the calling conference room terminal of impossibility of connections in response to the request for address resolution when the connections cannot be established.

According to another particular aspect of this invention, the ATM name system (ANS) is for use in a network system which carries out a conference between calling and destined conference room terminals through an ATM (Asynchronous Transfer Mode) network. The ANS is located in an additional network different from the ATM network and comprises a connector between the calling conference room terminal and the ANS and processing means for processing a request for address resolution sent from the calling conference room terminal through the additional network to resolve an AESA related to the destined conference room terminal on the ATM network.

According to another particular aspect of this invention, an ATM network system, the additional network is an intranet.

According to another particular aspect of this invention, the processing means resolves the AESA assigned to the destined conference room terminal.

According to yet another particular aspect of this invention, the processing means resolves the AESA assigned to a multipoint conference unit (MCU).

According to another particular aspect of this invention, the calling and the destined conference room terminals are connected by SVC (Switched Virtual Connection).

According to still another particular aspect of this invention, an ATM name system (ANS) is for use in a network system which carries out a conference between calling and destined conference room terminals connected by PVC (Permanent Virtual Connection) through an ATM (Asynchronous Transfer Mode) network. The ANS comprises a storage for storing PVC data concerned with the destined conference room terminal and processing means for processing the PVC data so as to establish the PVC between the calling and the destined conference room terminals when the conference is requested.

According to a specific view of this invention, a network system comprises an ATM (Asynchronous Transfer Mode) network, a plurality of conference room terminals accommodated in the ATM network, and an ATM name system (ANS). The ANS is used for a conference between the conference room terminals and comprises a storage for storing address resolution data concerned with the conference room terminals attending the conference and processing means for processing a request for address resolution issued from either one of the conference room terminals to resolve an address by referring to the address resolution data stored in the storage.

According to a specific view of this invention, the address is an AESA (ATM end system address) which is assigned to a selected one of the conference room terminals and which is stored as the address resolution data in the storage.

According to another specific view of this invention, the address is specified by PVC (Permanent Virtual Connection) data assigned to a selected one of the conference room terminals and which is stored as the address resolution data in the storage.

According to a specific view of this invention, the ANS is connected to each conference room terminal through a LAN (Local area network) different from the ATM network.

According to another specific view of this invention, the storage stores the address resolution data which have no hierarchical structure and which therefore uniquely define each conference room terminal.

According to a specific view of this invention, a network system further comprises a multipoint conference unit (MCU) accessed by the ANS on a multipoint conference and given a specific AESA.

According to a specific view of this invention, the ANS resolves the specific AESA of the MCU stored as the address resolution data.

According to another specific view of this invention, the storage comprises an address database for storing the address resolution data concerned with the conference room terminals and a topology database for storing topology data representative of positions of the respective conference room terminals in the network system.

According to yet another specific view of this invention, the storage further comprises a reservation database for storing reservation data concerned with a reservation of the conference; and a connection database for storing connection data concerned with a connection path used in the conference.

BRIEF DESCRIPTION OF THE DRAWING

FIG. 7 shows contents of an address database used in the ATM network system illustrated in FIG. 1;

FIG. 8 shows contents of a conventional ANS so as to compare them with the contents illustrated in FIG. 7;

FIG. 10 shows contents of a reservation database included in the ANS used in the above-mentioned network system;

FIG. 11 similarly shows contents of a topology database included in the ANS;

FIG. 12 similarly shows contents of a connection database included in the ANS;

FIG. 16 shows contents of an address database used in the system illustrated in FIG. 15.

DESCRIPTION OF THE PREFERRED EMBODIMENTS

Figure 1:
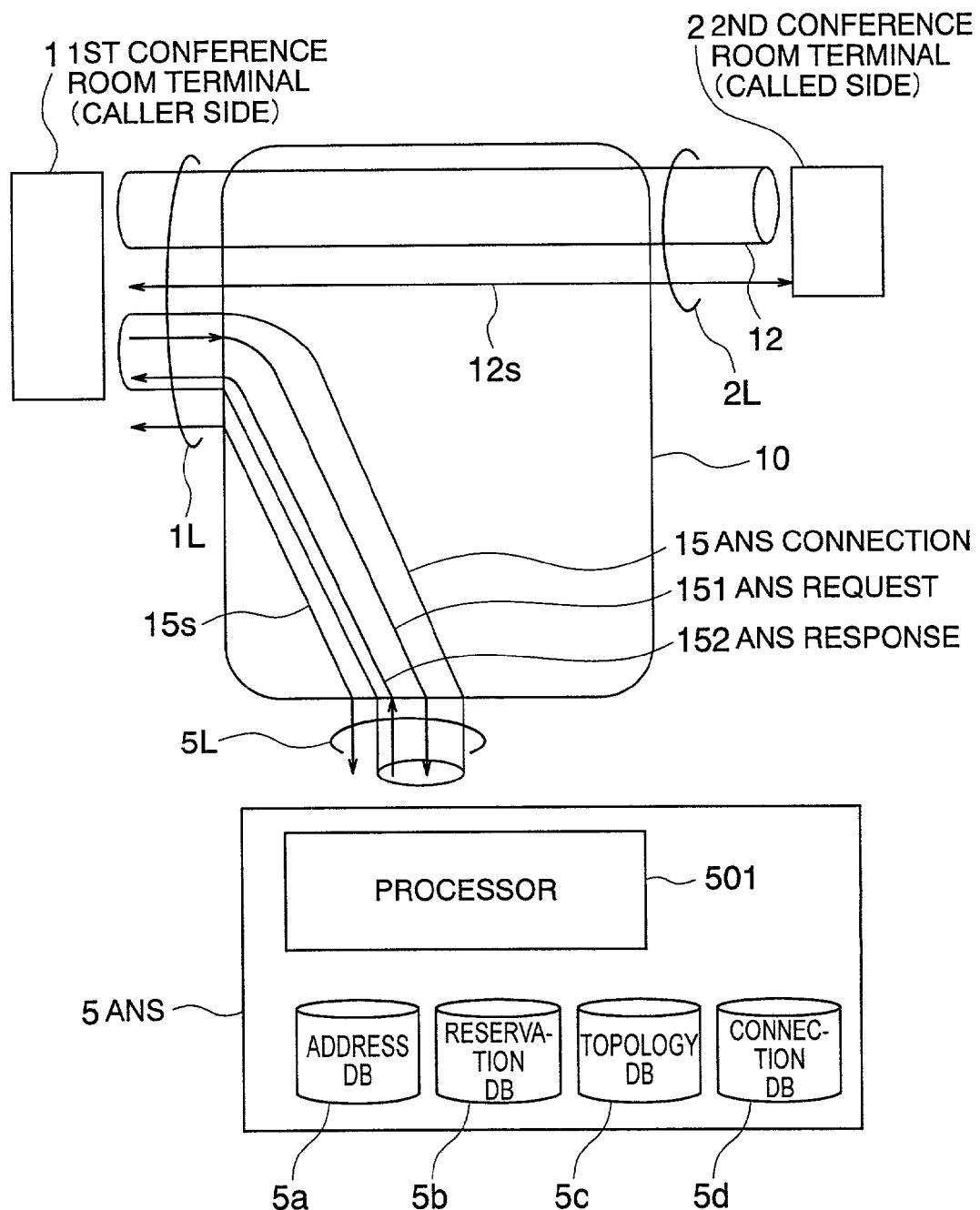
FIG. 1 is a block diagram of an ATM network system which comprises an ATM number system (ANS) according to an embodiment of this invention.

Referring to FIG. 1, an ATM network system is illustrated which comprises an ATM name system (ANS) 5 according to a first embodiment of this invention and an ATM network 10. The illustrated ATM network 10 accommodates a first conference room terminal 1 and a second conference room terminal 2 and is operable to hold or open a meeting or conference between the first and the second conference room terminals 1 and 2. In the illustrated example, the first and the second conference room terminals 1 and 2 are assumed to be a caller (sender) side and a called (callee or receiver) side, respectively, through television sets placed in the first and the second conference room terminals 1 and 2. In this connection, the above-mentioned network system may be called a television conference system or simply called a conference system while the first and the second conference room terminals may be also called calling and destined conference room terminals, respectively.

In the example illustrated in FIG. 1, the first and the second conference room terminals 1 and 2 and the ANS 5 establishes a connection through the ATM network 10 to one another in a manner to be described later in detail.

The ANS 5 illustrated in FIG. 1 has an address database (may be often abbreviated to an address DB) 5a, a reservation database (reservation DB) 5b, a topology database (topology DB) 5c, and a connection database (connection DB) 5d. Specifically, the address database 5a registers or stores a relationship between conference room names and the corresponding ATM end system addresses (AESAs). In addition, the address database 5a has a function of administrating priority classes of the conference rooms. The address database 5a is organized and registered by an administrator when an operation of the ATM network 10 is started.

The reservation database 5b manages reservation information. Specifically, the reservation database 5b registers and manages the reservation information which is issued from a user of the television conference system at an optional time and which is related to a conference held in the future.

The topology database 5c manages a topology of the ATM network 10. The topology database 5c is registered and organized by an administrator at the start of the operation of the ATM network 10.

The connection database 5d registers and manages an inner resource of the ATM network 10 related to a connection which has now been currently established. Such an inner resource may be, for example, a trunk line bandwidth (transmission line) and a multipoint conference unit (MCU). The connection database 5d is autonomously updated by the ANS 5 during the operation of the ATM network 10 under control of a processor 501. Practically, the processor 501 is connected to the ATM network 10 through a connector and serves to control all of the above-mentioned databases and to process various requests, commands, and data. In addition, the processor 501 is operable as a judgement unit for judging whether or not a conference is reserved, as will become clear as the description proceeds.

In FIG. 1, consideration is made about establishing a connection to hold the television conference between the first and the second conference room terminals 1 and 2 on the assumption that the first and the second conference room terminals 1 and 2 are the caller and the called sides, respectively, as mentioned before. In this event, both the first and the second conference room terminals 1 and 2 are instantly connected to each other without any reservation. This means that a conference or meeting is started at once or instantly due to such a connection and that the connection may be called an instant connection. Herein, it is presumed that each of the first and the second conference room terminals 1 and 2 has a television camera and a microphone both of which are used for transmission and a television monitor and a speaker for reception. In addition, each terminal 1 and 2 also has a coder and a decoder (collectively called a codec) and a CLAD (cell assembly and deassembly).

In addition, it is also assumed that the illustrated ANS 5 is assigned with an ATM end system address (AESA) and the AESA of the ANS 5 is previously registered by the administrator and is consequently announced to the first conference room terminal 1.

Under the circumstances, let the first conference room terminal 1 send a call to the ANS 5 through a signaling channel 15s and establish a connection 15. After establishment of the connection 15s, the first conference room terminal 1 sends a room name of the second conference room terminal 2 to the ANS 5 through the connection 15. Responsive to the room name, the ANS 5 searches or looks up the address database 5a by using the room name as a key. In this event, an AESA which is assigned to the second conference room terminal 2 is obtained as a result of the search and is sent back as an ANS response (depicted by 152 in FIG. 1) to the first conference room terminal 1 through the connection 15. When the AESA of the second conference room terminal 2 is resolved by the ANS 5 in the above-mentioned manner, the first conference room terminal 1 releases the connection 15 by the use of the signaling channel 15s.

Supplied with the AESA of the second conference room terminal 2, the first conference room terminal 1 sends a call towards the AESA of the second conference room terminal 2 through a signaling channel 12. In consequence, a connection 12 is established from the first conference room terminal 1 to the second conference room terminal 2. Establishment of the connection 12 makes it possible to start a television conference between the first and the second conference room terminals 1 and 2.

In FIG. 1, it is to be noted that the first conference room terminal 1 and the ATM network 10 are connected through a physical channel or line 1L which includes the above-mentioned signaling channels 12s and 15s and the connections 12 and 15. Likewise, the second conference room terminal 12 and the ATM network 2 are connected through a physical channel or line 2L which includes the signaling channel 12s and the connection 12. In addition, the ATM network 10 and the ANS 5 are connected through a physical channel or line 5L which includes the signaling channel 15s and the connection 15.

Figure 2:
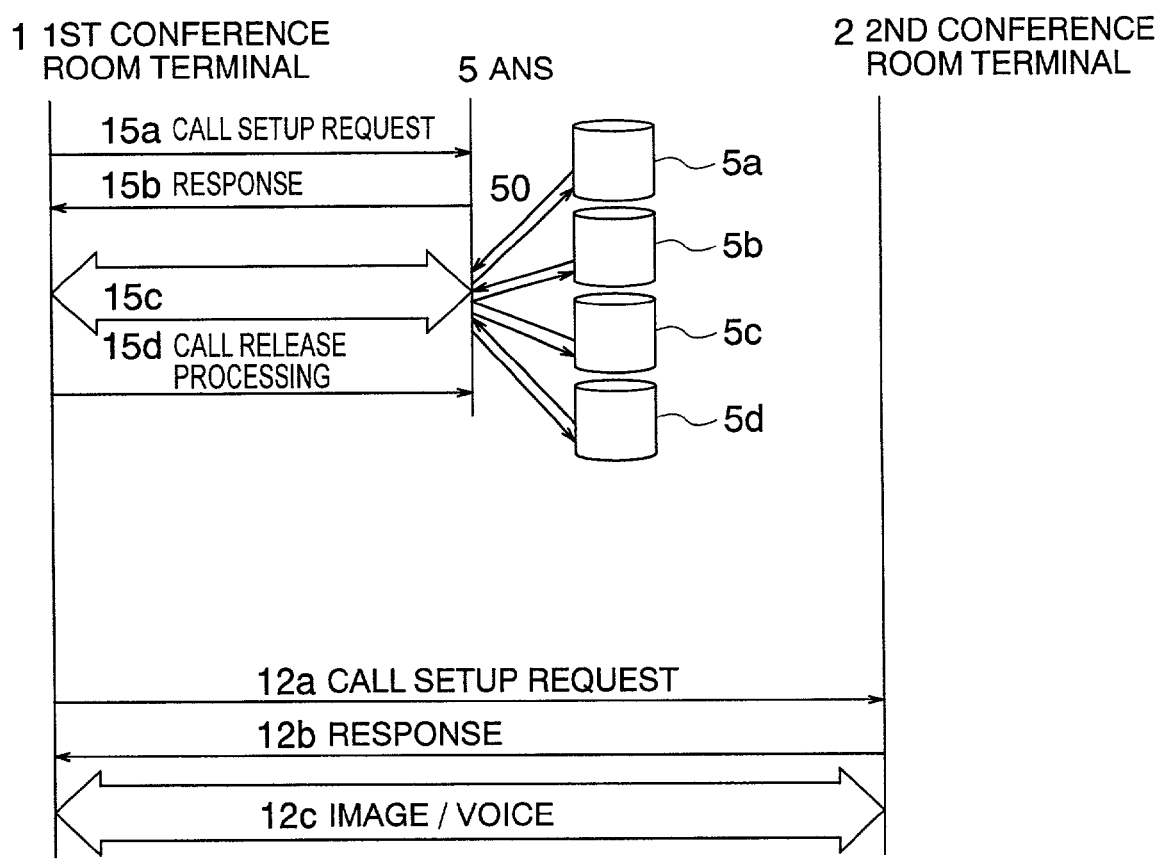
FIG. 2 shows a sequence diagram for use in describing an instant connection operation between two points in the ATM network system illustrated in FIG. 1.

Referring to FIG. 2, illustration is made of an operation sequence which is carried out on the instant connection (FIG. 1) so as to hold a conference or meeting between two points, such as the first and the second conference room terminals 1 and 2. In FIG. 2, the first conference room terminal 1 at first requires a connection to the ANS 5 by sending a call setup request 15a to the ANS 5 through the ATM network 10. Receiving a reply 15b from the ANS 5, the first conference room terminal 1 recognizes that a connection 15c is established between the first conference room terminal 1 and the ANS 5. Subsequently, the first conference room terminal 1 requests the ANS 5 to resolve an address through the connection 15c.

Supplied with the request of resolving the address, the ANS 5 carries out an operation in the following order depicted by (1) to (4):

(1) Referring to the address database 5a to specify a position of the second conference room terminal 2 within the network;

(2) Referring to the topology database 5c to specify transmission channels for the connection;

(3) Referring to the connection database 5d to specify a conference which currently occupies a part of a band within each transmission channel; and (4) Referring to the reservation database 5b, the address database 5a, and the topology database 5c to specify the transmission channel which is to be occupied by a next following conference to be held later.

On the basis of the above-mentioned result, the ANS 5 judges by the use of the processor 501 whether or not the connection to the requested conference room terminal 2 is permissible. If no influence is exerted on existing connections and reservations, the ANS 5 permits the connection and sends a reply (namely, the AESA of the second conference room terminal 2) to the first conference room terminal 1.

Responsive to the AESA of the second conference room terminal 2, the first conference room terminal 1 releases the connection 15c by call release processing 15d.

Subsequently, the first conference room terminal 1 requests a connection to the second conference room terminal 2 by issuing a call setup request 12a to the ATM network 10. Receiving a response 12b from the second conference room terminal 2, the first conference room terminal 1 establishes the connection between the first and the second conference room terminals 1 and 2. Thereafter, a television conference can be held through the connection.

The above-mentioned call setup request 15a, response 15b, and call releasing processing 15d are prescribed, for example, by ITU-T Recommendation Q.2931 and are featured by the following messages. Specifically, the call setup request is featured by a SETUP message and a CALL PROCEEDING message while the response 15b, a CONNECT message and a CONNECT ACKNOWLEDGE message. In addition, the call release processing 15d is featured by a RELEASE message and a RELEASE COMPLETE message. This applies to the following description also.

Figure 3:
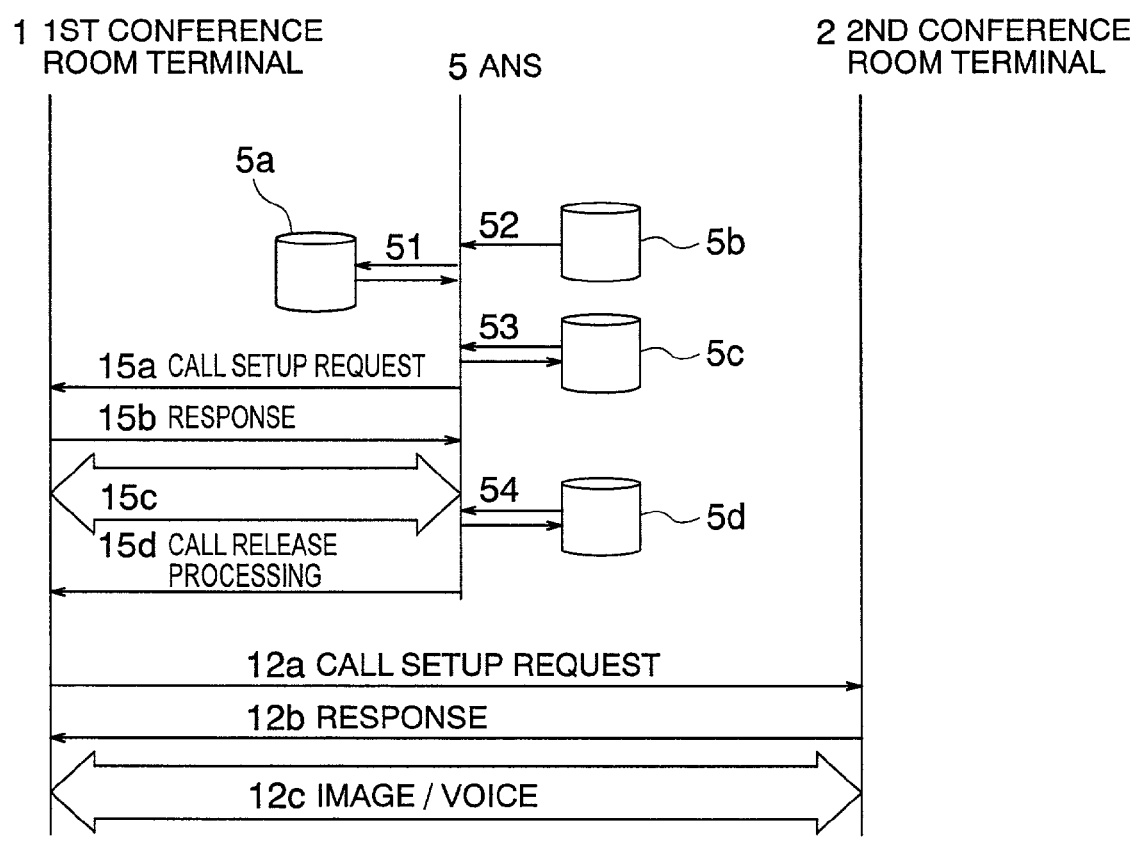
FIG. 3 shows a sequence diagram for use in describing a reserved connection operation between two points in the ATM network system illustrated in FIG. 1.

Referring to FIG. 3, description will be made about an operation which is executed when a connection is made by a reservation. Herein, it is assumed that the reservation is for reserving a conference between two points, such as the first and the second conference room terminals 1 and 2. At first, the ANS 5 accepts and registers a reservation related to a conference which will be started at an optional time instant in the future. Contents of the registered reservation may include attending conference room terminals, a conference start time, and a conference end time at least. Such registration may be made by the use of a key board placed in the ANS 5 or by communicating with an outer device through a communication channel. The reserved contents are registered or stored in the reservation database 5b in the ANS 5. The ANS 5 starts a connection between the registered conference rooms at the conference start time registered in the reservation database 5b.

To this end, the ANS 5b itself periodically monitors the reservation database 5b. When a reserved time is registered as the conference start time in the reservation database 5b, the reserved contents are read out of the reservation database 5b (as shown at a step 52) to obtain two conference room names to be connected to each other. In the illustrated example, the room names of the first and the second conference room terminals 1 and 2 are read out of the reservation database 5b to execute a one-to-one conference between the first and the second conference room terminals 1 and 2. Subsequently, the ANS 5 seeks or retrieves the address database 5a by the use of the conference room names (as shown at a step 51 in FIG. 3) to obtain AESAs of the conference room terminals 1 and 2 which attend the conference.

Thereafter, the ANS 5 sends the call setup request 15a to either one of the attending conference room terminals (the first conference room terminal 1 in the illustrated example) to request a connection thereto. Receiving a response 15b from the first conference room terminal 1, the ANS 5 judges that a connection depicted by 15c is established between the ANS 5 and the first conference room terminal 1. In this situation, the ANS 5 transmits a sequence of data to the first conference room terminal 1 through the connection 15c. In this event, the AESA of the second conference room terminal 2 is transferred as the data from the ANS 5 to the first conference room terminal 1 together with a connection indication of sending a call to the second conference room terminal 2. Thereafter, the connection 15c may be released because it becomes unnecessary after transferring the data and the indication.

Responsive to the AESA of the second conference room terminal 2 and the connection indication, the first conference room terminal 1 transfers a call setup request 12a to the ATM network 10 (illustrated in FIG. 1). The first conference room terminal 1 receives a response 12b from the second conference room terminal 2 and judges that a connection 12c is established between the first and the second conference room terminals 1 and 1. The illustrated connection 12c can transmit an audio signal and a video signal in a digital manner. Thus, a television conference or meeting is started through the connection 12c.

In the example illustrated in FIG. 3, the ANS 5 monitors the television conference and transfers a previous notice of finishing the conference to at least one of the first and the second conference room terminals 1 and 2. Such a previous notice is issued prior to the conference finish or end time and may be issued, for example, five minutes before the conference end time reserved and registered in the reservation database 5b. Such a previous notice may be executed by establishing a connection between the ANS 5 and each or either of the conference room terminals 1 and 2 and by sending a previous notice message of release from the ANS 5 through the connection. Responsive to the previous notice message, the conference room terminal 1 or 2 informs the other conference room terminal of being released soon by a visual display or an audible announcement. In fact, such forcible release is executed by the processor 501 which is therefore operable as a release unit.

Figure 4:
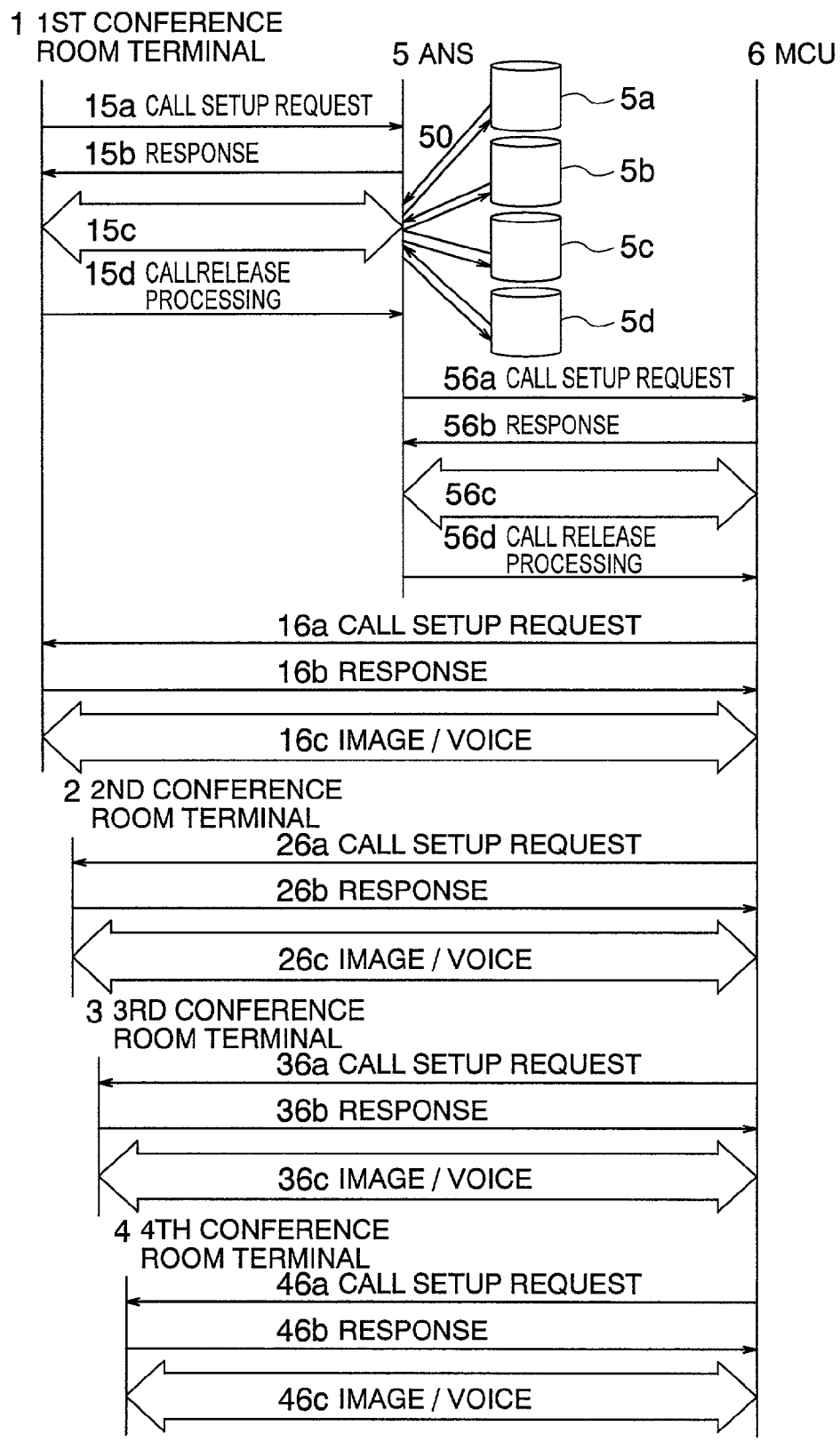
FIG. 4 shows a sequence diagram for use in describing an instant connection operation among four points in the ATM network system illustrated in FIG. 1.

Referring to FIG. 4, description will be made about a multipoint conference which is started by an instant connection. Herein, it is assumed that first through fourth conference room terminals 1 to 4 attend the multipoint conference. Let the first conference room terminal 1 send a call setup request 15a to the ATM network 10 to request a connection to the ANS 5. Receiving a response 15b from the ANS 5, the first conference room terminal 1 judges that a connection 5c is established between the first conference room terminal 1 and the ANS 5. Subsequently, the firs conference room terminal 1 transfers a sequence of data to the ANS 5 through the connection 15c and requests the ANS 5 to resolve an address.

Responsive to a request of resolving an address, the ANS 5 executes an operation symbolized by 50 in FIG. 4. More specifically, the operation in the ANS 5 is carried out under control of the processor 501 in the following order depicted by (1) through (4):

(1) Referring to the address database 5a to specify positions of the first through the fourth conference room terminals 1 to 4 within the ATM network 10;

(2) Referring to the topology database 5c to specify transmission channels which a connection in question uses;

(3) Referring to the connection database 5d to specify conferences which currently occupy a part of a band in the transmission channels and a multipoint conference unit (MCU); and (4) Referring to the reservation database 5b, the address database 5a, and the topology database 5c to specify a transmission channel and an MCU both of which are used by the currently requested conference.

In fact, the illustrated processor 501 executes the above-mentioned operations and may be called an operation unit which executes the operations.

Thus, the ANS 5 selects the transmission channel and the MCU used by the four-point conference and judges whether or not the connection to the conference rooms is permissible. If it is judged that no influence is given to the existing connections and reservations, the ANS 5 judges that the connection is permissible among the four conference room terminals 1 to 4. In this event, the ANS 5 sends a response 15c to the first conference room terminal 1 to indicate that the four-point conference can be started.

Responsive to the above-mentioned response 15c, the first conference room terminal 1 releases the connection 15c to the ANS 5 because the connection 15c becomes unnecessary any more.

Next, the ANS 5 searches a connection to an MCU 6 and issues a call setup request 56a to the ATM network 56a. Receiving a response 56b from the MCU 6, the ANS 5 judges that a connection 56c is established between the ANS 5 and the MCU 6. Thereafter, the ANS 5 informs the MCU 6 of all the AESAs assigned to the first through the fourth conference room terminals 1 to 4 attending the four-point conference. Thereafter, the ANS 5 carries out releasing processing 56d to release the connection 56c because the connection 56c becomes unnecessary.

When the ANS 5 judges that the connection is permissible, the ANS 5 retrieves the address database 5 again, as shown by the step 50 and obtain the AESAs of the second, the third, and the fourth conference room terminals 2, 3, and 4 also.

Subsequently, the MCU 6 establishes connections among the first through the fourth conference room terminals 1 to 4. Specifically, when a connection is established between the MCU 6 and the first conference room terminal 1, the MCU 6 searches the connection to the first conference room terminal 1 and issues a call setup request 16a to the ATM network 10. Responsive to a response 16b from the first conference room terminal 1, the MCU 6 judges that a connection 16c is established between the MCU 6 and the first conference room terminal 1. Thereafter, a television conference can be executed through the connection 16c.

Likewise, similar operation is carried out in connection with the other conference room terminals 2, 3, and 4. For example, the MCU 6 connects the second conference room terminal 2 by the use of a call setup request 26a, a response 26b, and a connection 26c and connects the third conference room terminal 3 by the use of a call setup request 36a, a response 36b, and a connection 36c. Similarly, the MCU 6 connects the fourth conference room terminal 4 by the use of a call setup request 46a, a response 46b, and a connection 46c.

The MCU 6 holds the multipoint, namely, the four-point conference through the connections 16c, 26c, 36c, and 46c by combining video signals with audio signals. At any rate, the connections 16c, 26c, 36c, and 46c are instantly formed among the MCU 6 and the conference room terminals 1, 2, 3, and 4.

Figure 5:
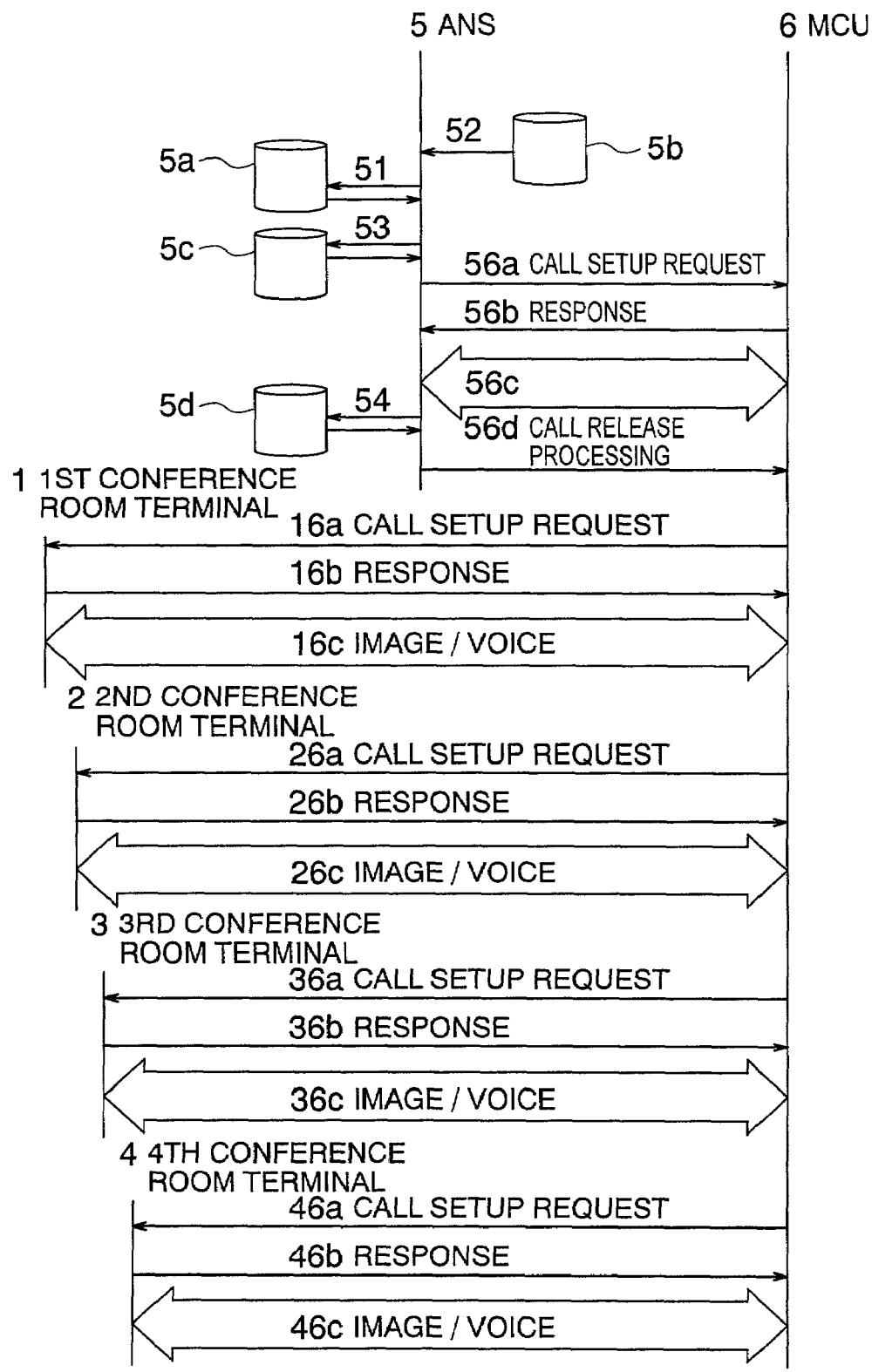
FIG. 5 shows a sequence diagram for use in describing a reserved connection operation among four points in the ATM network system illustrated in FIG. 1.

Referring to FIG. 5, description will be made about a multipoint conference based on a reservation for connections. In this event, the ANS 5 periodically monitors a reservation database 5b to detect whether or not there is a registered content which arrives at a reservation time and to read the registered content out of the reservation database 5b, as shown at a step 52. In this event, let three or more conference room names be obtained from the registered content. In the illustrated example, the first, the second, the third, and the fourth conference room terminals 1 to 4 attend the multipoint conference which may be therefore called a four-point conference.

After monitoring the reservation database 5b, the ANS 5 refers to the address database 5a at a step 51 to specify positions of the first through the fourth conference room terminals 1 to 4 within the ATM network 10. Subsequently, the topology database 5c is retrieved at a step 53 by the ANS to specify the transmission channels which are used by the connections.

At a step 54, the connection database 5d is retrieved to specify other instant conferences which occupy a part of the band in the transmission channels and MCUs. Thereafter, the ANS 5 retrieves the reservation database 5b, the address database 5a, and the topology database 5c and specifies the transmission channels and the MCUs both of which can be occupied by any other multipoint conferences that may be expected to be held later. Among the transmission channels and the MCUs, the ANS 5 selects transmission channels and the MCU to be used by the multipoint conference in question and judges whether or not the requested conference room terminals can be connected. If existing connections are influenced by the above-processing, the existing connections are forcibly released.

Thereafter, the ANS 5 searches the connections to the MCU 6 and issues a call setup request 56a to the ATM network 10 like in FIG. 4. The ANS 5 judges that the connection 56c to the MCU6 is established when a response 56b is received by the ANS 5 from the MCU 6. The ANS 5 transfers a sequence of data to the MCU 6 through the connection 56c and gives all of the AESAs of the first through the fourth conference room terminals 1, 2, 3, and 4 to the MCU 6. In this event, the ANS 5 sends the MCU 6 an indication of originating a call to all the attending room terminals. Thereafter, the connection 56c between the ANS 5 and the MCU 6 may be released by a release request 56d.

Next, the MCU 6 establishes each connection to the first through the fourth conference room terminals 1 to 4. For example, the connection to the first conference room terminal 1 is searched by the MCU 6 and a call setup request 16a is issued from the MCU 6 to the ATM network 10. The MCU 6 receives a response 16b from the first conference room terminal 1 and judges that a connection 16c is established. Thereafter, a television conference is held through the connection 16c.

As to the other conference room terminals 2, 3, and 4, similar operation is executed. Specifically, the operation concerned with the second conference room terminal 2 is carried out by the use of a call setup request 26a, a response 26b, and a connection 26c while the operation concerned with the third conference room terminal 3 is carried out by the use of a call setup request 36a, a response 36b, and a connection 36c. Likewise, the operation related to the fourth conference room terminal 4 is carried out by the use of a call setup request 46a, a response 46b, and a connection 46c.

Thus, the multipoint television conference is held by the use of the four connections 16c, 26c, 36c, and 46c and by combining a video signal and an audio signal in the MCU 6.

Figure 6:
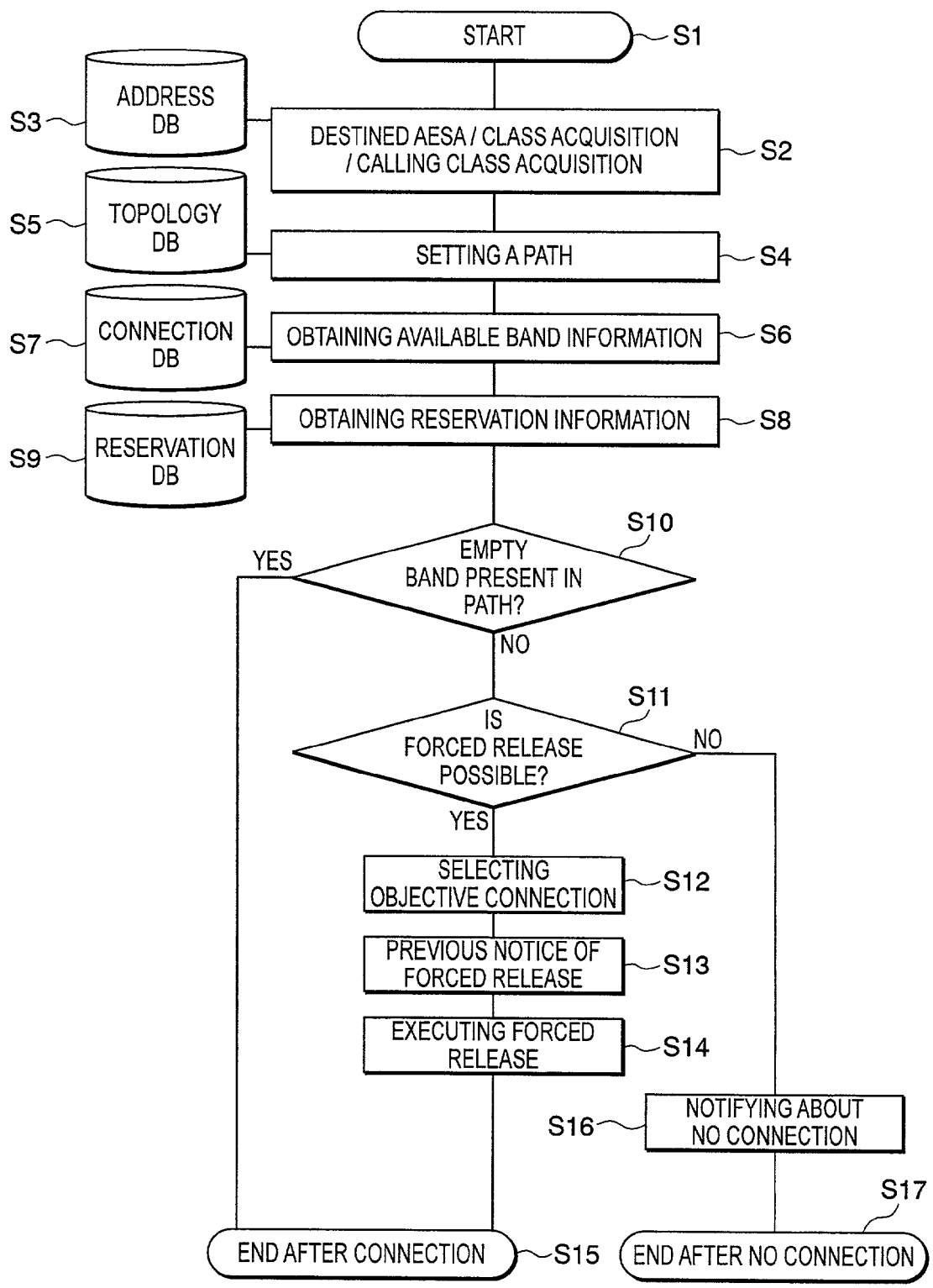
FIG. 6 show a flow chart for use in describing the instant connection operation carried out between two points in the ATM network system illustrated in FIG. 1.

Referring to FIG. 6, description will be made about an operation which is executed in the ANS 5 on the one-to-one conference. The operation is started at a step S1 and proceeds to a step S2 at which the ANS 5 retrieves the address database (depicted by S3 in FIG. 6) to detect an AESA of a called conference room terminal and its priority class. In addition, the priority class of a calling conference room terminal (namely, the first conference room terminal 1) is also obtained by retrieving the address database S3 by using, as a key, the AESA of the calling conference room terminal that issues a request of resolving an address, as shown at the step S2. Thus, the ANS 5 judges the AESA of the calling conference room terminal and the AESA of the called conference room terminal.

Next, the ANS 5 refers to the topology database (depicted by S5) at a step S4. Since the topology database S5 stores network topology information registered by an administrator, the ANS 5 can detect, at the step S4, an inner path which includes an afresh connection in the ATM network 10.

Decision of the inner path is followed by a step S6 of referring to the connection database (depicted by S7 in FIG. 6). At the step S7, previous connections are grasped which occupy a connection band used by existing connections arranged within the transmission channels to be used by the afresh connection. Thereafter, the reservation database (depicted by S9) is retrieved by a step S8 which retrieves whether or not reservation information is present which represents a band to be occupied later. Thus, the ANS 5 gains the reservation information from the reservation database S9 as shown at the step S8.

The ANS 5 judges at a step S10 whether or not an empty band is present in the path and proceeds to a step S15 so as to establish a connection if the empty band is detected at the step S10. Subsequently, the ANS 5 sends the AESAs of the called conference room terminal to the calling conference room terminal.

On the other hand, when no empty band is detected at the step S10, the ANS 5 executes a step S11 of judging whether or not forced release is possible. In this event, when a connection is established between conference room terminals of low priority classes, such a connection may be forcibly released to give a band to another connection. When the forced release of the connection can be effected, the ANS 5 selects the forced release at the step S11 which is followed by a step S12 at which the ANS 5 selects an objective connection. The step S12 proceeds to a step S13 at which a previous notice of forced release is sent to conference room terminals to be forcibly released. Such a previous notice of the forced release serves to distinguish between connection release due to a network malfunction and forced release due to congestion and is announced to conference room terminals which currently hold a television conference. After the previous notice of the forced release, the forced release is actually executed at a step S14 to forcibly form an empty band. Such an empty band is used at the step S15 to establish a novel or afresh connection. The forced release can be accomplished by establishing a connection from the ANS 5 to the conference room terminals or the MCU and by transferring a release message to the conference room terminals through the connection.

If the forced release can not be carried out, the step S11 is followed by a step S16 of notifying about no connection and processing is completed at a step S17 at which no connection is carried out.

It is to be noted that the forced release can not be executed, for example, when a connection of a reservation has been already made or when a current connection already connected has a priority level higher than that of a novel call.

A priority level of a connection may be judged in various manners. For example, an average value may be calculated between priority levels of calling and called conference room terminals. When at least one of attending conference room terminals has a high priority level, such a conference is judged as a high priority level. On the other hand, when at least one of attending conference room terminals has a low priority level, such a conference may be handled as a low priority level. In addition, the priority level is divided into more than two classes.

In the meanwhile, when an occupied band exceeds a predetermined value in the transmission channel and the remaining band becomes very narrow, judgement may be judged as occurrence of congestion. In this situation, a control method may be adopted such that only a connection with a high priority level can be established.

Referring to FIG. 7, exemplification is made about contents which are held in the address database of the ANS according to this invention. As shown in FIG. 7, the address database is specified by a list which has an item number column 5a1, a conference room name column 5a2, an AESA column 5a3, and a class column 5a4. In the illustrated example, item numbers 1 to 4 are registered in the item number column 5a1 while names of a head office, branches A1, B1, and B2 are described in Chinese characters of Japanese or English in the conference room name column 5a2. It is noted that such names are described in a manner different from the ASCII character set, such as "salmon.data.example.com", of a hiearchical structure. In the AESA column 5a3, each AESA has practically forty-digits which are represented by a hexadecimal notation but which are partially omitted in the illustrated list for brevity of description. In the class column 5a4, two classes, such as "priority" or "nonpriority", are illustrated but three or more classes may be prepared.

Referring to FIG. 8, a conventional ANS will be conceptually described for a better understanding of this invention and has a list itemized into an item number column 5a5, a host name column 5a6, and a AESA or a resolution column 5a7. In FIG. 8, it is to be noted that the host names are described in the ASCII character set of the hiearchical structure in the host name column 5a6 and that the item number "3" is prepared for a host which is placed outside of the registered contents and which is therefore described as "Except for ".data.example.com" in the host name column 5a6. When a host except for ".data.example.com" is indicated, the ANS can not be resolved by the ".data.example.com" layer and issues a query to any other ANS placed in ".example.com" layer, as readily understood from FIG. 8.

From comparing the lists of FIGS. 7 and 8 with each other, it has been found out that the ANS 5 illustrated in FIG. 7 registers no host name and issues no query to an upper ANS layer.

Figure 9:
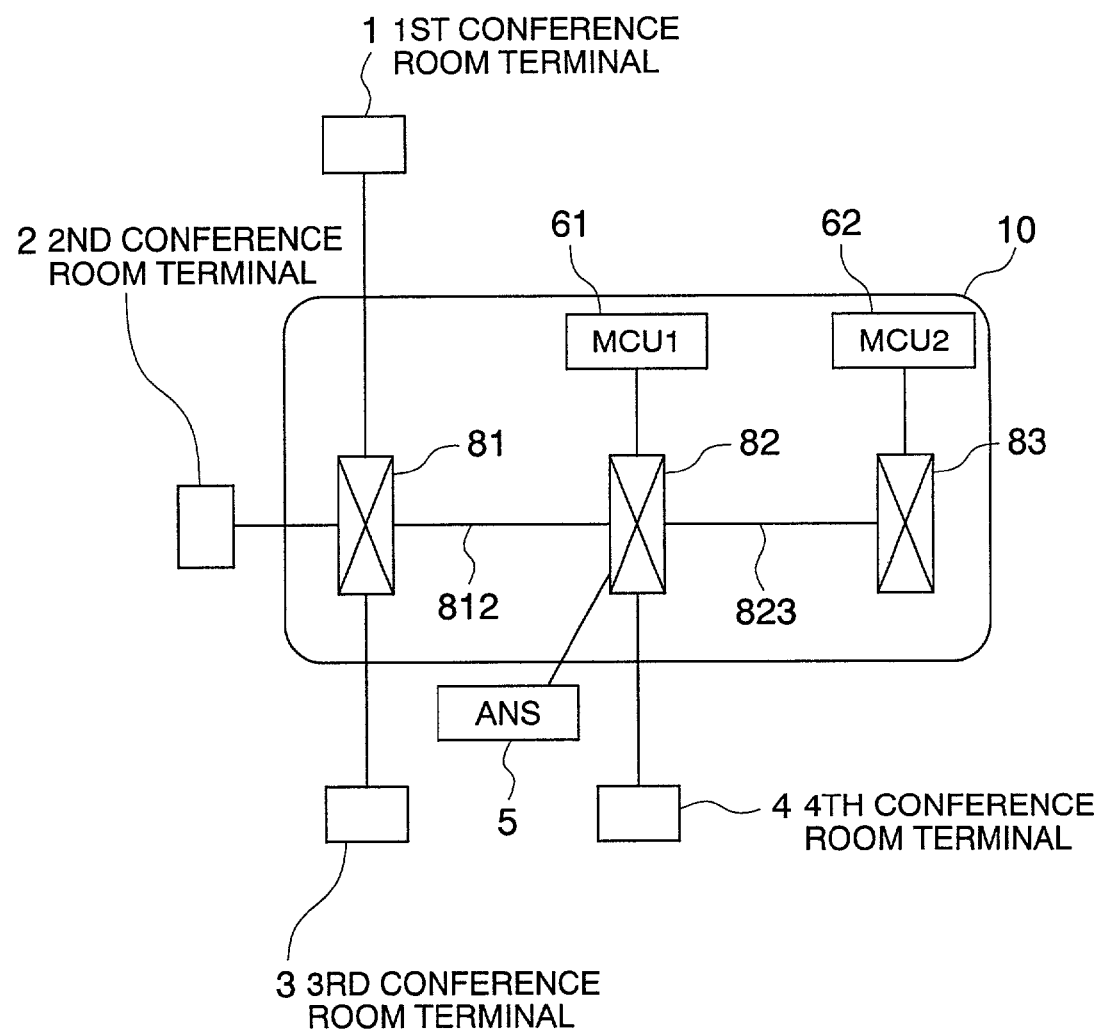
FIG. 9 shows a topology diagram for use in describing selection of MCUs when the MCUs are arranged in the ATM network system illustrated in FIG. 1.

Referring to FIG. 9, description will be made about an ATM network system which is used on holding a multipoint conference through a plurality of multipoint conference units (MCUs). In this event, the MCUs are selected in consideration of positions of conference room terminals in an ATM network 10. In this event, it is assumed that a multipoint conference is held among four of the conference room terminals depicted by 1, 2, 3, and 4 through an ATM network 10. The illustrated ATM network 10 has first through third ATM switches 81, 82, and 83 and first and second MCUs which are depicted by 61 and 62 and which are accommodated in the second and the third ATM switches 82 and 83, respectively. In addition, the first through the third conference room terminals 1, 2, and 3 are accommodated in the first ATM switch 81 while the fourth conference room terminal 4 is accommodated in the second ATM switch 82. Furthermore, the first and the second ATM switches 81 and 82 are coupled to each other through a transmission channel 812 while the second and the third ATM switches 82 and 83 are coupled to each other through a transmission channel 823, as shown in FIG. 9.

In the illustrated example, it is possible to hold the multipoint conference by selecting either the first MCU 61 or the second MCU 62. However, selection of the second MCU 62 brings about occupation of a band assigned to the transmission channel 823 and, as a result, deteriorates a utilization ratio of resources in the ATM network system. In addition, a propagation delay time and exchange processing become long because a multistage of the ATM switches, such as 81 and 82, should be used.

On the other hand, selection of the first MCU 61 dispenses with the use of the transmission channel 823 and results in improvement of the utilization ratio of the resources. Moreover, the propagation delay time and the exchange processing become short because the ATM switches are reduced in number and a transmission distance becomes short.

In FIG. 9, it should be noted that the illustrated ATM number system (ANS) 5 according to this invention is related to the second ATM switch 82 in the illustrated manner. In this event, the ANS 5 has a topology database which stores topology information for specifying the topology shown in FIG. 9. Furthermore, the ANS 5 may have a resolution unit for detecting an optimum one of the MCUs by using the names of the attending conference room terminals as keys to resolve an AESA assigned to the optimum MCU. To this end, selection of the optimum MCU may be made on the basis of, for example, the stage number of the in the ATM switches and an occupied bandwidth. At any rate, it has been found out in the above-mentioned example that none of the conference room terminals select and indicate any MCU and, instead, the ANS 5 selects the optimum MCU.

Herein, it should be noted in connection with the above embodiment that judgement can be made in the ATM network about an ATM switch which accommodates a conference room terminal by referring to an AESA. In this event, the AESA may be referenced from an upper digit and the ATM switch can be judged by a part of the AESA. This shows that each position of the conference room terminals can be detected by resolving the AESA from each conference room name by referring to the address database. In other words, it is judged by resolving the AESA which one of the ATM switches each conference room terminal belongs to.

Referring to FIG. 10, the reservation database 5b which is applicable to this invention is specifically illustrated so as to facilitate understanding of this invention. At first, it is readily understood that the reservation database 5b is renewed or updated when a reservation of a television conference is reserved by a user and when connections related to its reservation are finished.

More specifically, the illustrated reservation database 5b has an item number column 5b1, a connection column 5b2, and a date column 5b3. In the item number column 5b1, item numbers are successively stored to specify conferences from "1" to "3" while sources and destinations of connections are stored in the connection column 5b2. In addition, the date column 5b3 is loaded with dates of the conferences "1" to "3". For example, it is readily understood that the conference "1" is a one-to-one conference (5b2) between a head office "2" and a branch "A1" and will be held on April 1, for a time from 13:15 to 15:00, as shown in the date column 5b3. Likewise, the conference "2" is a multipoint conference among a head office "2" and branches "A2", "B1", and "C1" and will be held on April 2, for a time from 10.30 to 12:00. Furthermore, the conference "3" is a one-to-one conference between branches "D1" and "E1" and will be held on April 3 for a time from 14:30 to 16:00. Thus, the date column 5b3 is loaded with a start time and an end time also.

Referring to FIG. 11, shown is the topology database 5c which is applicable to this invention and which is specified by an item number column 5c1, a section column 5c2, and a capacity column 5c3. Specifically, the section column 5c2 is loaded with a subscriber line between a conference room terminal and an ATM switch and with a relationship of connection between ATM switches. In the capacity column 5c3, a band capacity of each channel is loaded in the form of a transmission rate.

For example, a conference room terminal of a head office 1 is accommodated in a channel "1" of a head office switch SW which has a band capacity of 150 Mbps, as shown in a row of the item number "1". Similarly, a channel "2" of a head office switch SW is connected to a channel "1" of a branch A switch.

Referring to FIG. 12, exemplified is the connection database 5d which is applicable to this invention and which has contents automatically renewed by the ANS 5 on establishment and release of each connection. Specifically, the contents of the connection database 5d are classified into an item number (5d1), an occupied section (5d2), a reserve/instant (5d3), a start time (5d4), and a class (5d5), as shown in FIG. 12. The item number (5d1) is loaded with a number assigned to the registered contents while the occupied section (5d2) is loaded with transmission channels or paths through which each connection is extended. The reserve/instant (5d3) specifies either a reservation connection or an instant connection while the start time (5d4) is loaded with a start time. In addition, the class (5d5) is loaded with either priority or non-priority of each connection. Herein, the contents of (5d3), (5d4), and (5d5) are referenced when a candidate for forcible release is decided and selected.

In the meanwhile, let a connection be made about a conference room terminal with priority and another conference room terminal without priority. Such a connection may be handled, depending on management of the ATM network system, and may be dealt with as a connection with priority or a connection without priority. Alternatively, priority or non-priority may be selected on establishment of a connection by a conference room terminal. In this case, the conference room terminal should have a function of selecting either priority or non-priority and applying a selected result to the ATM network each time when a call is established.

Figure 13:
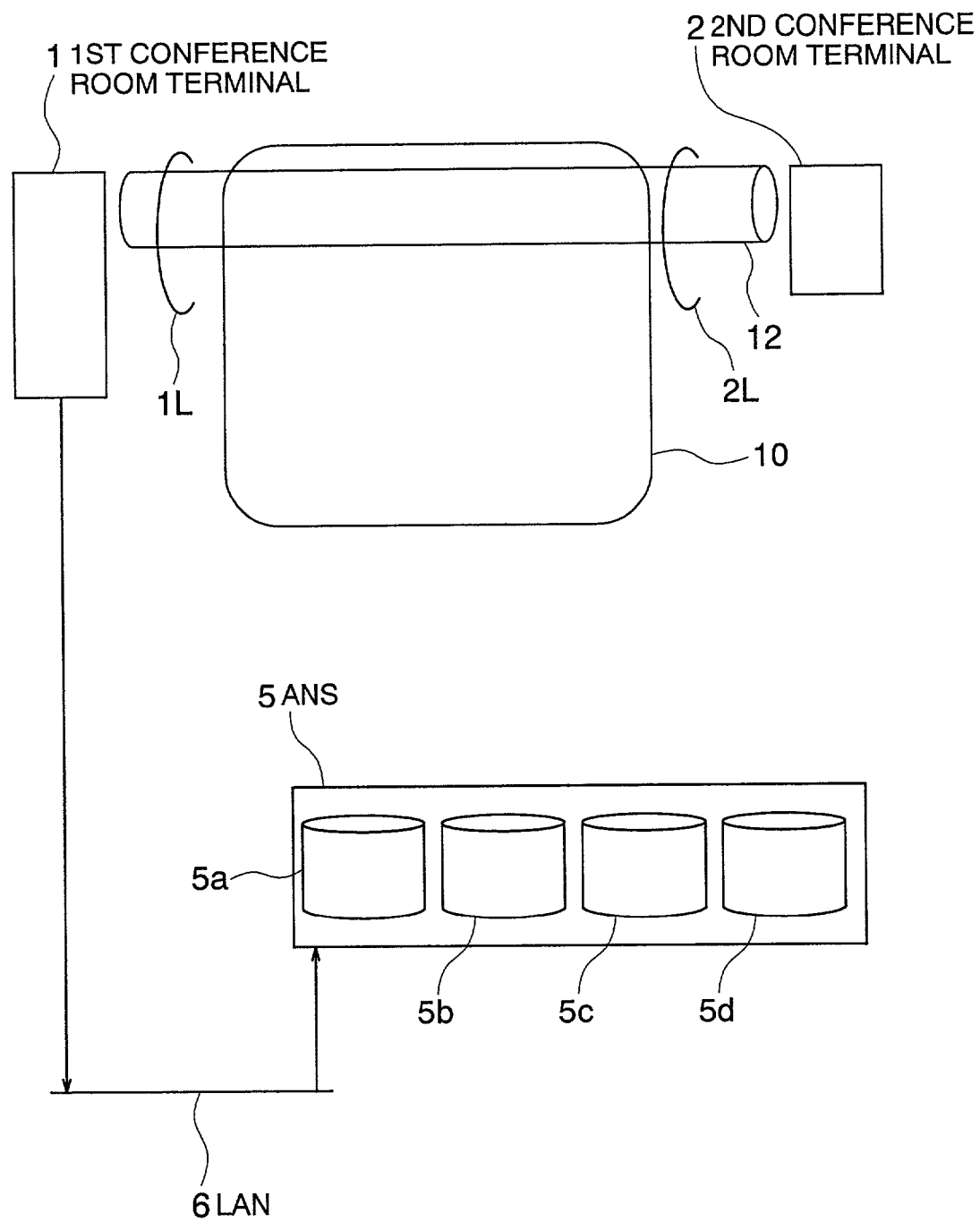
FIG. 13 shows a block diagram of another network system according to another embodiment of this invention which includes a LAN.

Referring to FIG. 13, description will be made about an ATM network system according to another embodiment of this invention. The ATM network system shown in FIG. 13 is featured by connecting a conference room terminal 1 to an ANS 5 through a local area network (LAN) 6 instead of an ATM network 10. In other words, a connection between the conference room terminal 1 and the ANS 5 is established by not using the ATM network 10.

In the illustrated example, the conference room terminal 1 is connected to the ANS 5 through the LAN 6 to form an intranet. Such a connection between the conference room terminal 1 and the ANS 5 through the LAN 6 is operable in a manner similar to the connection 15c (FIG. 2) which is operable to issue the query from the conference room terminal 1 to the ANS 5. For brevity of illustration, a LAN between a second room terminal 2 and the ANS 5 is omitted from FIG. 13. Practically, it is to be noted that all of the conference room terminals are connected to the ANS 5 through a LAN.

Figure 14:
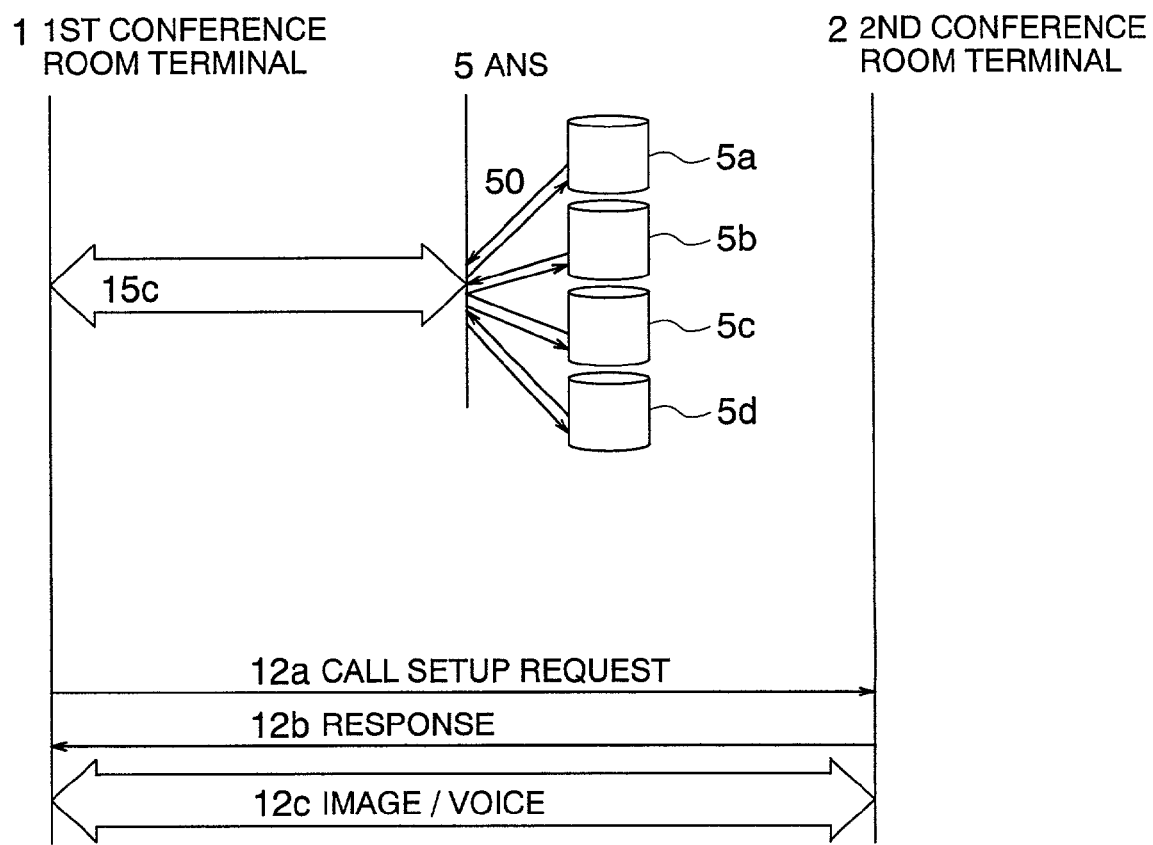
FIG. 14 shows a sequence diagram for use in describing an instant connection between two points in the network system illustrated in FIG. 13.

Referring to FIG. 14 together with FIG. 13, description will be made about a one-to-one conference which is instantly held between the first and the second conference room terminals 1 and 2. At first, the first conference room terminal 1 carries out data transmission/reception to and from the ANS 5 through the LAN 6. In this event, an ANS request and an ANS response are transmitted and received between the first conference room terminal 1 and the ANS 5 through the LAN 6 as a data sequence (15c) illustrated in FIG. 14. Such an ANS request and an ANS replay are similar to those mentioned in conjunction with FIG. 2.

Thereafter, an operation 50 is executed in a manner similar to that illustrated in FIG. 2. Specifically, the operation 50 proceeds by referring to the address database 5a, the reservation database 5b, the topology database 5c, and the connection database 5d. In this event, judgement is made about whether or not a requested conference can be held. If possible, the ANS 5 resolves the AESA and sends the resolved AESA back to the first conference room terminal 1. Responsive to the AESA, the first conference room terminal 1 informs the ATM network of a call setup request 12a to the second conference room terminal 2. Receiving a reply 12b from the second conference room terminal 2, the first conference room terminal 1 judges that a connection is established between the first and the second conference terminals 1 and 2. Subsequently, the conference is started by the use of the connection 12c.

Figure 15:
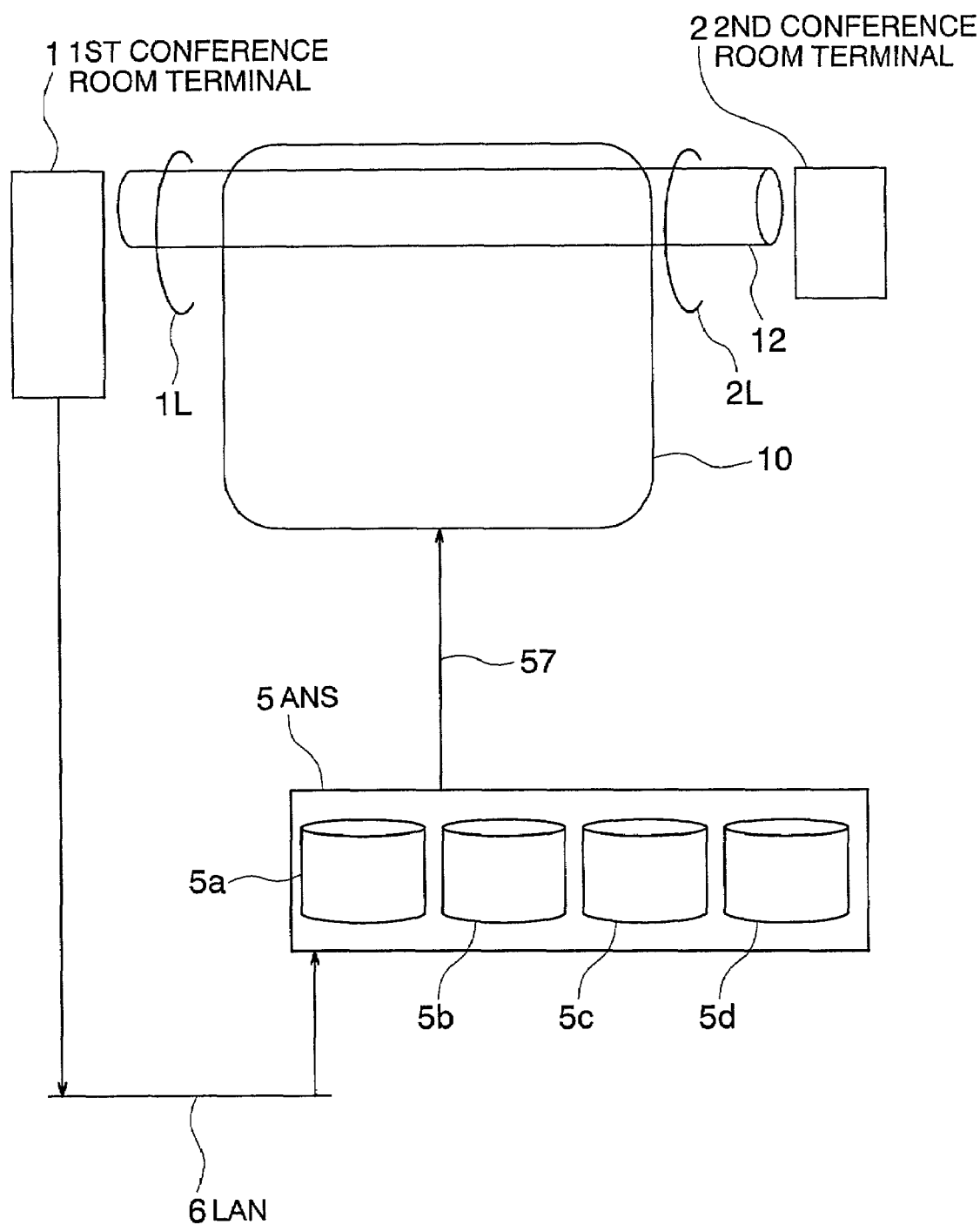
FIG. 15 shows a block diagram of a network system according to still another embodiment of this invention, which carries out a connection by the use of PVC.

Referring to FIG. 15, description will be directed to an ATM network system according to still another embodiment of this invention. In the illustrated example, a connection for a television conference is established by using a permanent virtual connection (PVC) in lieu of a switched virtual connection (SVC). In this event, the ANS 5 illustrated in FIG. 15 does not resolve the AESA and, instead, resolves an ATM switch accommodating a conference room terminal (namely, the first conference room terminal 1 in FIG. 15). Moreover, a channel number, a VPI (Virtual Path Identifier), and a VCI (Virtual Channel Identifier) are also resolved by the ANS 5. Resolved results are sent from the ANS 5 to the ATM network 10 as indications or commands 57. Practically, the indications 57 are received by NetWare Management System (NMS) that is operable as the ingress in the ATM network 10.

Referring to FIG. 16, the ANS 5 shown in FIG. 15 is featured by an address database 5a that has registered contents of FIG. 16. As illustrated in FIG. 16, the registered contents are classified into item numbers (5a8), conference room names (5a9), accommodated positions (5a10), and classes (5a11). As readily understood from FIG. 16, ATM switch names, channels, VPIs, and VCIs are stored in the address database 5a as the accommodated positions, instead of the AESA registered in the SVC.

Figure 17:
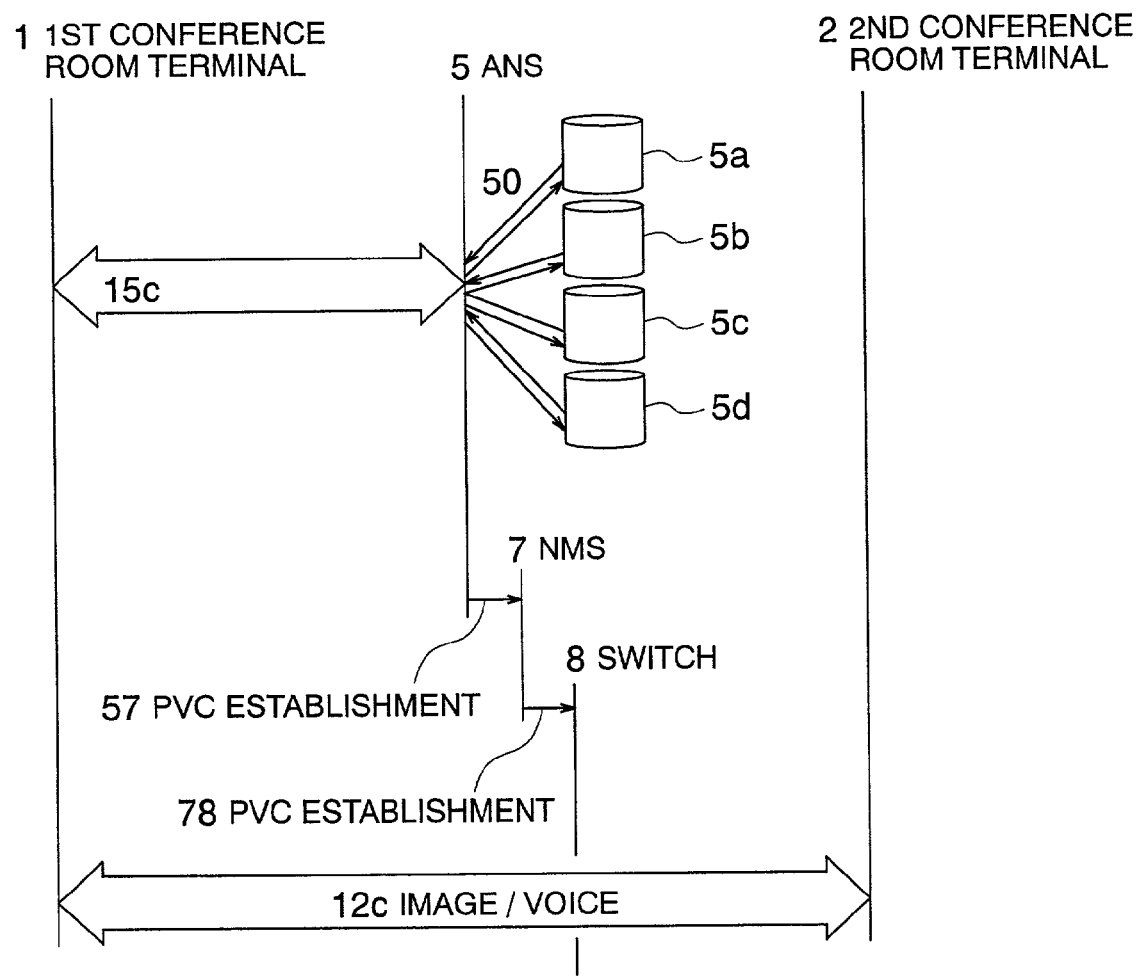
FIG. 17 shows a sequence diagram for use in an instant connection operation between two points in the network system illustrated in FIG. 15.

Referring to FIG. 17, an operation will be made about the ATM network system which is illustrated in FIGS. 15 and 16 in detail and which uses the PVC. In the illustrated example, exemplified is a one-to-one conference which is held between two points by an instant connection. Communication between each conference room terminal and an ANS 5 is performed by previously establishing a PVC between each conference room terminal and the ANS 5 and by exchanging a message through the PVC. In FIG. 17, data transmission and reception are made through a LAN between each conference room terminal and the ANS 5 by the use of the PVC previously established by an administrator so as to transmit and receive an ANS request and an ANS response similar to those mentioned in FIG. 2. Thus, the connection in FIG. 17 is established through the LAN, instead of the ATM network 10. Thereafter, operation 50 proceeds in a manner similar to that illustrated in FIG. 2. In this event, it is judged whether or not a requested conference can be held, by referring to the address database 5a, the reservation database 5b, the topology database 5c, and the connection database 5d. If possible, the ANS 5 sends the NMS 7 an indication 57 of establishing a PVC. Responsive to the indication 57, the NMS 7 supplies a switch or switches 8 in the ATM network 10 with an indication 78 of establishing the PVC. Thus, a connection 12c is established by the PVC and is used in the conference.

The ATM network system according to this invention has the following features. The first feature is that use is not made about a host name represented by a hiearchical domain name and that a priority degree or level can be previously registered by an administrator, taking, into consideration, an importance level of a conference on occurrence of congestion. Such congestion might occur in a band of a transmission channel or an MCU. Specifically, the ANS resolves the AESA on the basis of each conference room terminal name uniquely defined, instead of using any hiearchical domain name as a key. In addition, the reason why the priority degree can be registered in accordance with the importance level of the conference is because a class is registered in connection with priority/non-priority of each conference room terminal.

The second feature is that an AESA of an MCU can be resolved on a multipoint conference. Such an MCU acts as a destination of a connection from each conference room terminal and serves to process an image and a voice. In this event, the ANS may not resolve all AESAs of the conference room terminals attending the multipoint conference but resolve the AESA assigned to the MCU, as mentioned before.

The third feature is that, when judgement is made about the multipoint conference, an optimum one of the MCU is selected and its AESA is resolved by the ANS. To this end, each conference room terminal attending the multipoint conference can be recognized about its position within the ATM network and an occupied band in the transmission channel can be predicted when the connection is actually established.

The fourth feature is that, when the AESA of the optimum MCU is resolved, connections are made between each conference room terminal and the optimum MCU at a call setup step carried out after the resolution of the AESA. This is because the ANS makes the MCU issue a call and, as a result, the MCU is connected to each conference room terminal.

The fifth feature is that a reservation which includes a start time, an end time, and conference room terminal(s) is received and a connection is established on the basis of the reservation. A connection based on such a reservation can be established or released at a predetermined time.

The sixth feature is that a previous announcement can be issued to each conference room terminal during a conference prior to the end time reserved. Such an operation can be realized by managing the end time of the conference and by issuing the previous announcement to each conference room terminal.

The seventh feature is that, on receiving a request of resolving an AESA, judgement is made about whether or not a connection is established in response to a result of resolution. To this end, management is made about a currently occupied band of a transmission channel in the ATM network, an occupied state of the MCU, and a future reservation state.

The eighth feature is that, by referring to a priority level or class previously registered, a conference room terminal with a high priority level is preferentially connected on occurrence of congestion in a band of a transmission channel and an MCU. Such an operation is carried out by judging each priority level of the conference room terminals and by preferentially connecting the conference room terminal with the high priority level.

The ninth feature is that, on receiving a connection request from a conference room terminal with a higher priority level, a connection with a lower priority level can be forcibly released on occurrence of the transmission channel and the MCU. This operation is realized by a releasing member for forcibly releasing the connection related to the lower priority.

The tenth feature is that, when the forcible release is executed, attendants to the released conference can recognize either a release due to a malfunction in the network or a release based on the forcible release. For this purpose, an informing unit is prepared so as to inform the attendants of the forcible release.

The eleventh feature is that, when judgement is made about not forming any connection due to congestion, an announcement of not forming any connection is issued to a caller side conference room terminal. Such an operation can be realized by installing an announcement unit for announcing of a reason why the connection cannot be done.

The twelfth feature is that, when a conference room terminal is accommodated in an ATM network and is also connected to another outer network, such as an intranet (LAN), accommodating the ANS, an AESA can be retrieved through another outer network from the conference room terminal. In this event, communication between the conference room terminal and the ANS is carried out through another outer network in lieu of the ATM network.

The thirteenth feature is that another television conference system can be realized by the use of the PVC (Permanent Virtual Connection) instead of the SVC (Switched Virtual Connection). For this purpose, an ATM switch name, a channel number, a VPI, and VCI are resolved by the ANS.

What is claimed is:

1. An ATM name system CANS) exclusively used in a network system which carries out a conference between two conference room terminals through an ATM (Asynchronous Transfer Mode) network, the conference room terminals comprising a calling conference room terminal for issuing a request for address resolution to the ANS before establishment of a connection between the calling conference room terminal and a destined one of the conference room terminals, the request indicating a room name assigned to the destined conference room terminal that is different from a host name of a hierarchical structure, comprising:
    a storage section for storing the room name and an ATM end system address (AESA) of the destined conference room terminal; and
    processing means, operated when the ANS is called from the calling conference room terminal and thereafter receives the request for address resolution sent from the calling conference room terminal, for processing the request to resolve the AESA of the destined conference room terminal by referring to the storage by the use of the room name and to send a resolved AESA to the calling conference room terminal and to thereby make the calling conference room terminal establish a connection between the destined conference room terminal by the use of the resolved AESA,
    wherein the storage section comprises an address database for storing a priority level corresponding to the room name together with the corresponding AESA, and
    wherein the processing means is operable in response to the request to also resolve a priority class of the conference between the calling and the destined conference room terminals with reference to the priority level stored in the address database.

2. An ATM name system as claimed in claim 1, wherein the storage section further comprises:
    a reservation database for storing a reservation that is specified by a start time and an end time of the conference together with the connection.

3. An ATM name system as claimed in claim 2, wherein the processing means comprises:
    judging means for judging whether or not the conference is reserved by referring to the reservation database to monitor the start and the end times when the reservation is made in connection with the conference.

4. An ATM name system as claimed in claim 3, wherein the judging means further starts the connection at the start time when the reservation is made, so as to hold the conference between the calling and the destined conference room terminals.

5. An ATM name system as claimed in claim 4, wherein the judging means judges whether or not a conference duration between the start and the end times lapses, to send, prior to the end time, a previous announcement of releasing the connection to at least one of the calling and the destined conference room terminals.

6. An ATM name system as claimed in claim 5, wherein the storage section further comprises:
    a topology database for storing a topology of each conference room terminal in the network system; and
    a connection database for storing a connection relationship between the calling and the destined conference room terminals;
    the processing means monitoring the conference with referring to the topology and the connection relationship stored in the topology and the connection databases.

7. An ATM name system (ANS) for use in a network system which carries out a multipoint conference between a calling conference room terminal and a plurality of destined conference room terminals through an ATM (Asynchronous Transfer Mode) network, the calling conference room terminal being for issuing a request for address resolution to the ANS before establishment of connections for the multipoint conference, the ANS being associated with a multipoint conference unit (MCU) and comprising:
    processing means, operated when the ANS is called by the calling conference room terminal and thereafter receives the request from the calling conference room terminal, for processing the request from the calling conference room terminal to resolve an ATM end system address (AESA) assigned to each of the plurality of the destined conference room terminals when the multipoint conference is indicated by the request;
    communication means for carrying out communication between the ANS and the MCU, by sending the resolved AESA of each of the calling and the destined conference room terminals from the ANS to the MCU and by making the MCEJ establish connections between the MCU and the respective conference room terminals attending the multipoint conference; and
    a topology database for storing topology data representative of positions of the calling and the destined conference room terminals in the network system and band data representative of bands of transmission channels used in the multipoint conference,
    wherein the processing means is for selecting the MCU by referring to the topology database.

8. An ATM name system as claimed in claim 7, wherein the processing means selects the MCU by recognizing the positions of the calling and the destined conference room terminals and by predicting occupied bands from the band data.

9. An ATM name system (ANS) for use in a network system which carries out a multipoint conference between a calling conference room terminal and a plurality of destined conference room terminals through an ATM (Asynchronous Transfer Mode) network, the calling conference room terminal being for issuing a request for address resolution to the ANS before establishment of connections for the multi point conference, the ANS being associated with a multipoint conference unit (MCU) and comprising:
    processing means, operated when the ANS is called by the calling conference room terminal and thereafter receives the request from the calling conference room terminal, for processing the request from the calling conference room terminal to resolve an ATM end system address (AESA) assigned to each of the plurality of the destined conference room terminals when the multipoint conference is indicated by the request;
    communication means for carrying out communication between the ANS and the MCU, by sending the resolved AESA of each of the calling and the destined conference room terminals from the ANS to the MCU and by making the MCU establish connections between the MCU and the respective conference room terminals attending the multipoint conference; and wherein the communication means issues a call setup request to the MCU after the AESA of the MCU is resolved.

10. An ATM name system CANS) for use in a network system which carries out a multipoint conference between a calling conference room terminal and a plurality of destined conference room terminals through an ATM (Asynchronous Transfer Mode) network, the calling conference room terminal being for issuing a request for address resolution to the ANS before establishment of connections for the multipoint conference, the ANS being associated with a multipoint conference unit (MCU) and comprising:

processing means, operated when the ANS is called by the calling conference room terminal and thereafter receives the request from the calling conference room terminal, for processing the request from the calling conference room terminal to resolve an ATM end system address (AESA) assigned to each of the plurality of the destined conference room terminals when the multipoint conference is indicated by the request;

communication means for carrying out communication between the ANS and the MCU, by sending the resolved AESA of each of the calling and the destined conference room terminals from the ANS to the MCU and by making the MCU establish connections between the MCU and the respective conference room terminals attending the multipoint conference; and a connection database for storing each occupied band of currently used transmission channels and a reserved state;

the processing means comprising:

judging means for judging whether or not the connections are established by referring to each occupied band and the reserved state of the connection database.

11. An ATM name system as claimed in claim 10, wherein the judging means also refers to an occupied state of the MCU so as to establish the connections.

12. An ATM name system (ANS) for use in a network system which carries out a multipoint conference between a calling conference room terminal and a plurality of destined conference room terminals through an ATM (Asynchronous Transfer Mode) network, the calling conference room terminal being for issuing a request for address resolution to the ANS before establishment of connections for the multipoint conference, the ANS being associated with a multipoint conference unit (MCU) and comprising:

processing means, operated when the ANS is called by the calling conference room terminal and thereafter receives the request from the calling conference room terminal, for processing the request from the calling conference room terminal to resolve an ATM end system address (AESA) assigned to each of the plurality of the destined conference room terminals when the multipoint conference is indicated by the request;

communication means for carrying out communication between the ANS and the MCU, by sending the resolved AESA of each of the calling and the destined conference room terminals from the ANS to the MCU and by making the MCU establish connections between the MCU and the respective conference room terminals attending the multi point conference; and means for storing a priority level of each conference room terminal;

the processing means comprising:

means for determining the connections with reference to the priority level so as to preferentially establish the connections related to the conference room terminal of a higher priority level, when any congestion takes place in the network system.

13. An ATM name system as claimed in claim 12, wherein the processing means comprises:

means for forcibly releasing an existing connection in consideration of an occupied state of the transmission channels and the MCU.

14. An ATM name system as claimed in claim 13, wherein the processing means comprises:

means for transmitting an indication of forcibly releasing to conference room terminals to be released.

15. An ATM name system as claimed in claim 14, wherein the processing means further comprises:

means for informing the calling conference room terminal of impossibility of connections in response to the request for address resolution when the connections cannot be established.

16. An ATM name system (ANS) for use in a network system which carries out a conference between calling and destined conference room terminals through an ATM (Asynchronous Transfer Mode) network, the ANS being located in an additional network different from the ATM network and comprising:

a connector between the calling conference room terminal and the ANS; and processing means for processing a request for address resolution sent from the calling conference room terminal through the additional network to resolve an ATM end system address (AESA) related to the destined conference room terminal on the ATM network and to thereby make the calling conference room terminal establish a connection between the destined conference room terminal by the use of the resolved AESA, wherein the additional network is an intranet.

17. An ATM name system (ANS) for use in a network system which carries out a conference between calling and destined conference room terminals through an ATM (Asynchronous Transfer Mode) network, the ANS being located in an additional network different from the ATM network and comprising:

a connector between the calling conference room terminal and the ANS; and processing means for processing a request for address resolution sent from the calling conference room terminal through the additional network to resolve an ATM end system address (AESA) related to the destined conference room terminal on the ATM network and to thereby make the calling conference room terminal establish a connection between the destined conference room terminal by the use of the resolved AESA, wherein the processing means resolves the AESA assigned to the destined conference room terminal.

18. An ATM name system (ANS) for use in a network system which carries out a conference between calling and destined conference room terminals through an ATM (Asynchronous Transfer Mode) network, the ANS being located in an additional network different from the ATM network and comprising:

a connector between the calling conference room terminal and the ANS; and processing means for processing a request for address resolution sent from the calling conference room terminal through the additional network to resolve an ATM end system address (AESA) related to the destined conference room terminal on the ATM network and to thereby make the calling conference room terminal establish a connection between the destined conference room terminal by the use of the resolved AESA, wherein the processing means resolves the AESA assigned to a multipoint conference unit (MCU).

19. An ATM name system (ANS) for use in a network system which carries out a conference between calling and destined conference room terminals through an ATM (Asynchronous Transfer Mode) network, the ANS being located in an additional network different from the ATM network and comprising:

a connector between the calling conference room terminal and the ANS; and processing means for processing a request for address resolution sent from the calling conference room terminal through the additional network to resolve an ATM end system address (AESA) related to the destined conference room terminal on the ATM network and to thereby make the calling conference room terminal establish a connection between the destined conference room terminal by the use of the resolved AESA, wherein the calling and the destined conference room terminals are connected by SVC (Switched Virtual Connection).

20. A network system comprising an ATM (Asynchronous Transfer Mode) network, a plurality of conference room terminals accommodated in the ATM network, and an ATM name system (ANS), wherein the ANS is used for a conference between the conference room terminals and comprises:

a storage for storing address resolution data concerned with the conference room terminals attending the conference to resolve a channel number, a VPI, and VCI; and processing means for processing a request for address resolution issued from either one of the conference room terminals by resolving the channel number, the VPI, and the VCI and by referring to the address resolution data stored in the storage, wherein the ANS is connected to each conference room termal through a LAN (Local area network) different from the ATM network.

* * * * *